Feb. 1, 1955  W. B. PENCE  2,700,993
JOINTER KNIFE SETTING TOOL
Filed Nov. 23, 1953
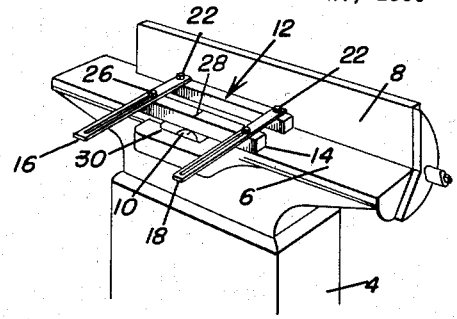
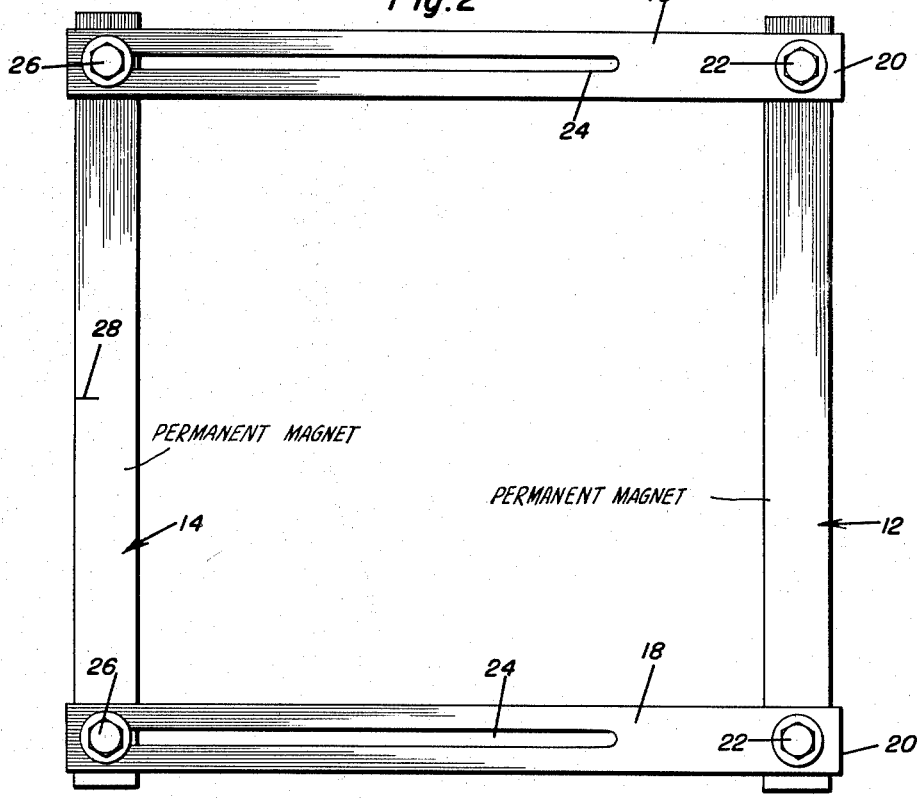
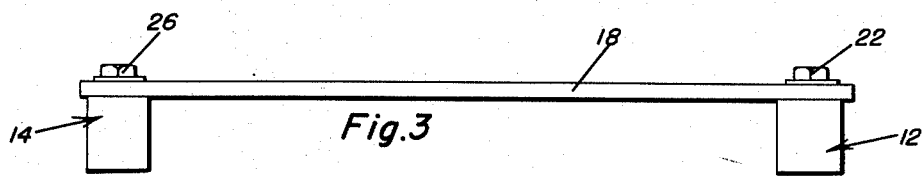
William B. Pence
INVENTOR.

United States Patent Office 2,700,993
Patented Feb. 1, 1955

2,700,993

JOINTER KNIFE SETTING TOOL

William B. Pence, San Angelo, Tex.

Application November 23, 1953, Serial No. 393,555

4 Claims. (Cl. 144—114)

The present invention relates to a wood jointer characterized by a horizontal work table having a perfectly smooth and flat work surface and provided with the usual gap or opening through which cutting knives on the rotatable cutter head are exposed and operable in a well known manner, a vertical work guide along one longitudinal edge of the table against which the work piece is slidingly pressed and moved along in customary fashion, and a readily applicable and removable jig or tool which when properly combined with the work table and guide make it possible to assist the user not only in gauging the desired position or positions of the cutter knives, but to accurately gauge and set the same to occupy uniform positions around the periphery of the rotary cutter head.

It is a matter of common knowledge to persons skilled in the art to which the invention relates that the problem of expeditiously gauging and setting cutter blades so that the cutting edges are exactingly located in respect to the axis of rotation of the head is a common problem; that inventors in this line of endeavor have resorted to the use of varying gauges and instrumentalities to assist in achieving the desired end result, quick and accurate setting of the radial cutter blades in slots provided therefor in the cutter head.

It would appear that prior art knife setting gauges have apparently not met with widespread endorsement, adoption and use because it is still the time consuming practice in many shops to experiment by trial and error and to pull the blades in and out of their slots by loosening and tightening the set screws and by adjusting the extreme cutting edges to meet the surface of a work piece which is placed on the table to span the knife exposing hole in the work table. Because of inaccurate results and painstaking and time consuming efforts to achieve this manual solution of the knife setting problem, I have been prompted to solve it through the medium of a tool or instrumentality which may be characterized, generally speaking, as a readily applicable and removable jig. In carrying out the principles of the invention, at least one bar magnet of a permanent type is utilized and is incorporated in a readily attachable and detachable frame structure. This magnet has a perfectly precision finished flat bottom which adheres to the flat work surface of the table and has a suitable index or marker line thereon which is centered in respect to the opening in the table and which serves to actually slide and pull the knives out of their slots one-by-one as the head is turned around through a complete circle. Each blade is thus attracted to and held against the magnet at the index point by first loosening the set screw and then tightening it after it has been regulated in its slot-retained position. Consequently, all of the knives can be set as to the exact same distances in respect to point of projection radially beyond the periphery of the head with resultant keen and uniform cutting achievements.

In carrying out a preferred embodiment of the invention, the jig takes the form of a four-part frame which is made up of a pair of substantially duplicate permanent bar magnets and a pair of arms cooperable therewith, the arms resting atop the respective magnets and being securely bolted to one magnet and having slotted adjustable connection with the other magnet so that the two can be moved toward and from each other to enable the jig to function on small and large wood jointers, ranging from 4" x 12" and on up.

Other objects, features and advantages will become more readily apparent from the following description and the accompanying sheet of illustrative drawings.

In the drawings, wherein like numerals are employed to designate like parts throughout the views:

Figure 1 is a perspective view showing a wood jointer and the improved jig and the manner in which it is constructed and used on the work table of the jointer;

Figure 2 is a plan view of the jig or knife setting tool per se; and

Figure 3 is an edge elevation of the same.

Reference is had first to Figure 1 showing a conventional type wood jointer characterized by a base or stand 4 and a horizontal work table having a smooth work piece supporting and feeding surface 6. Along one longitudinal edge and extending vertically at right angles is an upstanding wall 8 which may be conveniently referred to here as the work piece guide. The work surface has the usual opening means therein over which the work piece (not shown) is pressed by hand or otherwise fed and through which the bladed peripheral portion of a rotary cutter head 10 is exposed and operates in a well known manner. It is necessary to remove the cutting knives or blades from time to time and to replace them in their radial slots (not detailed), and whenever this is done, it is necessary to carefully double-check and correct the established positions of the knives so that the respective outer cutting edges will all be in the same circular path, that is, the same distance from the axis of rotation of the head. This requirement of adjustment is recognized throughout the trade, and many gauges, instrumentalities and devices have been evolved and produced to accomplish somewhat the same result as is herein under consideration, uniform setting of the cutting edges of the cutting knives. The tool or jig which is employed on the work table to achieve this end result is, generally speaking, a readily attachable and detachable substantially rectangular knock-down frame. As best shown perhaps in Figures 2 and 3, the frame is characterized by a pair of substantially duplicate permanent bar magnets, one of which is denoted by the numeral 12 and the other one by the numeral 14. Actually, these bar magnets are substantially rectangular and elongated in form and are uniform in cross-section and the bar magnet 12 serves as a hold-down device for the over-all frame and also as a sort of a straight edge in that the bottom surface thereof adheres to the flat work surface 6, while the vertical surface adheres to the corresponding flat but right angularly disposed surface of the guide 8 in the manner shown in Figure 1. This bar magnet 12 therefore positions and satisfactorily holds the device in conjunction, of course, with the complemental magnet 14. This magnet has perfectly smooth surfaces and the bottom surface thereof rests atop the surface 6 and spans the opening through which the bladed periphery of the cutter head operates. The two magnets are coplanar and in spaced parallelism and are adjustable toward and from each other and are held in assembled frame relationship. This is accomplished through the medium of added strip members or arms which are denoted by the numerals 16 and 18. Actually, these arms are duplicates and the end portions 20—20 rest atop the corresponding flat end portions of the bar magnet 12 where they are fastened securely by bolts 22—22. These same arms are provided with slots 24—24 which serve to accommodate similar bolts 26 carried by the end portions of the bar magnet 14 and serving to adjustably join the bar magnet 14 with said arms 16 and 18. The bar magnet is provided at its exact center with a marker point or index 28 which is adapted to be located at the exact crest of the path of swing of the cutter knives or blades on the cutter head as the latter travels in the opening means 30 in Figure 1. Usually, when no gauge is provided, the knives are pulled to touch the work piece, and then they are tightened by fastening the usual set screws (not shown). First, one knife is leveled and adjusted and set, and then all the other knives are likewise attended to, and this method is unsatisfactory as well as time consuming and tedious. Besides, it is not accurate. With this invention, with the device in place, the knives are pulled to the magnet, and each end of the knife is held in place by the magnetic properties of the bar. Each knife is set and the set screw is tightened, and this takes but little time, and the result is uniformity and accuracy in cutting results.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination, a wood jointer having a horizontal work piece supporting and feeding table provided with a flat work surface having an opening through which cutting knives on a rotatable cutter head are exposed and operable in a well known manner, a vertical work guide along one longitudinal edge of said table against which the work piece is slidingly pressed and held as it is pushed along, a first permanent magnet attached to said work surface and an adjacent surface of said guide, a second permanent magnet lying on said work surface with a limited portion bridging said opening and serving to bodily lift and pull one loosened cutting knife out of a slot in the cutter head and to hold it in its intended radially projecting position, relative to the outer periphery of the head, while the usual set screw on the head is tightened and so that the knife will "stay put" at the same radial distance position of the other complementary knives on said head.

2. The structure defined in claim 1, wherein said magnets are rectangular in cross-section, are duplicates of each other and are held together in coplanar spaced parallelism by way of assembling and retaining legs bolted atop the respective magnets.

3. A jig for use on the work table of a wood jointer and which functions to attract and hold a projectible and retractible knife in a radial slot provided therefor in a rotary cutter head comprising a readily applicable and removable frame including a permanent bar magnet having a precision finished flat bottom surface to rest on the flat work surface of the jointer work table in a position to bridge over the gap hole in said work table through which the cutter knives on the usual rotary cutter head operate.

4. For use in conjunction with a wood jointer having a horizontal work supporting and feeding table provided with a flat work surface having an opening through which cutting knives on a rotatable cutter head are exposed and operable in a well known manner, a vertical work guide along one longitudinal edge of said table against which the work piece is slidingly pressed and held as it is pushed along, a first permanent magnet attached to said work surface and an adjacent surface of said guide, a second permanent magnet lying on said work surface with a limited portion bridging said opening and serving to bodily lift and pull one loosened cutting knife out of a slot in the cutter head and to hold it in its intended radially projecting position, relative to the outer periphery of the head, while the usual set screw on the head is tightened and so that the knife will "stay put" at the same radial distance position of the other complementary knives on said head, a jig comprising the pair of spaced parallel coplanar bar magnets and slotted arms attached at corresponding ends to one magnet and adjustably connected at their opposite ends to the adjacent end portions of the other bar magnet.

References Cited in the file of this patent

UNITED STATES PATENTS

| | | |
|---|---|---|
| 1,225,552 | Wuesthoff | May 8, 1917 |
| 1,501,695 | Wurdack | July 15, 1924 |
| 2,116,306 | Dziembowski | May 3, 1938 |
| 2,589,865 | Rivard | Mar. 18, 1952 |
| 2,605,658 | Sanchez | Aug. 5, 1952 |